US012220374B2

(12) United States Patent
Jolly et al.

(10) Patent No.: US 12,220,374 B2
(45) **Date of Patent: *Feb. 11, 2025**

(54) METHODS AND SYSTEMS FOR VIBRATIONALLY EXCITING A LARYNGEAL NERVE

(71) Applicant: Passy-Muir, Inc., Irvine, CA (US)

(72) Inventors: Alex Jolly, Newport Beach, CA (US); Cameron Jolly, Newport Beach, CA (US); Kristin King, Littleton, NC (US); Jose Comino, Irvine, CA (US); Daniel Carrillo, Irvine, CA (US); Wayne Fong, Irvine, CA (US); Kenneth Green, La Habra Heights, CA (US)

(73) Assignee: Passy-Muir, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,465

(22) Filed: Nov. 30, 2023

(65) Prior Publication Data

US 2024/0091099 A1 Mar. 21, 2024

Related U.S. Application Data

(63) Continuation of application No. 17/887,299, filed on Aug. 12, 2022, now Pat. No. 11,850,205, which is a (Continued)

(51) Int. Cl.
*A61H 23/02* (2006.01)

(52) U.S. Cl.
CPC ...... *A61H 23/02* (2013.01); *A61H 2201/1611* (2013.01); *A61H 2201/165* (2013.01); (Continued)

(58) Field of Classification Search
CPC .......... A61H 23/00–06; A61H 2023/002–045; A61H 39/00–086; A61H 2039/005; (Continued)

(56) References Cited

U.S. PATENT DOCUMENTS 2,273,078 A 2/1942 Wright
4,143,648 A 3/1979 Cohen et al.
(Continued)

FOREIGN PATENT DOCUMENTS

AU 2006265985 3/2011
AU 2011201177 4/2011
(Continued)

OTHER PUBLICATIONS

Translation of WO-2019184615 accessed from PE2E-Search. (Year: 2019).*
(Continued)

*Primary Examiner* — Valerie L Woodward
*Assistant Examiner* — Paige Kathleen Bugg
(74) *Attorney, Agent, or Firm* — Knobbe Martens Olson & Bear LLP

(57) ABSTRACT

A laryngeal nerve exciting system includes a collar holding a bridge, or a neckband, pressing soft tissue nerve exciters against a patient's neck providing a source of vibrations to stimulate the laryngeal nerve through the larynx. At least one exciter, and preferably two exciters, provide vibrations at preferably 70 Hz to 110 Hz and sufficiently strong to penetrate to the laryngeal nerve. The exciters may be held by the collar circling the neck, or by the neck band partially circling the neck. The therapy system includes a Personal Digital Assistant (PDA) and software which wirelessly connects, monitors, and triggers the device. The system may be used to treat dysphagia, chronic cough, and spasmodic dysphonia.

16 Claims, 8 Drawing Sheets

Related U.S. Application Data continuation of application No. 17/305,282, filed on Jul. 2, 2021, now Pat. No. 11,413,214, which is a continuation of application No. 16/853,477, filed on Apr. 20, 2020, now abandoned.

(60) Provisional application No. 62/836,195, filed on Apr. 19, 2019.

(52) U.S. Cl.
CPC .................. *A61H 2201/501* (2013.01); *A61H 2201/5071* (2013.01); *A61H 2205/04* (2013.01)

(58) Field of Classification Search
CPC .... A61H 2205/04; A61H 11/00; A61H 99/00; A61H 2201/0157; A61H 2201/12–123; A61H 2201/165; A61H 2201/5061; A61H 2201/5071; A61H 1/008; A61F 5/055; A61F 5/05883; A61F 5/05816; A61F 5/05833; A61F 5/56
USPC ...................................................... 601/46, 79
See application file for complete search history.

(56) References Cited

U.S. PATENT DOCUMENTS 4,685,448 A 8/1987 Shames et al.
5,007,410 A 4/1991 DeLaney
5,086,788 A 2/1992 Castel et al.
5,111,814 A 5/1992 Goldfarb
5,350,407 A 9/1994 McClure et al.
5,562,718 A 10/1996 Palermo
5,611,771 A 3/1997 Taylor
5,725,564 A 3/1998 Freed et al.
5,861,022 A 1/1999 Hipskind
5,871,508 A 2/1999 Thompson et al.
5,891,185 A 4/1999 Freed et al.
5,897,579 A 4/1999 Sanders
5,987,359 A 11/1999 Freed et al.
6,039,679 A 3/2000 Yu
6,104,958 A 8/2000 Freed et al.
6,131,535 A 10/2000 So
6,198,970 B1 3/2001 Freed et al.
6,343,232 B1 1/2002 Mower
6,354,991 B1 3/2002 Gross et al.
6,393,323 B1 5/2002 Sawan et al.
6,484,053 B2 11/2002 Leelamanit et al.
6,735,315 B1 5/2004 Ifukube et al.
7,039,468 B2 5/2006 Freed et al.
7,182,738 B2 2/2007 Bonutti et al.
7,254,444 B2 8/2007 Moore et al.
7,280,873 B2 10/2007 Freed et al.
7,349,739 B2 3/2008 Harry et al.
7,582,066 B2 9/2009 Shimotori
7,606,623 B2 10/2009 Ludlow et al.
7,660,636 B2 2/2010 Castel et al.
8,388,561 B2 3/2013 Ludlow et al.
8,449,445 B2 5/2013 Ludlow et al.
8,579,839 B2 11/2013 Ludlow et al.
8,808,207 B2 8/2014 Ludlow et al.
8,852,074 B2 10/2014 Ludlow et al.
9,776,064 B2 10/2017 Harty
10,071,016 B2 9/2018 Ludlow et al.
11,229,576 B2 1/2022 Jolly et al.
11,344,471 B2 5/2022 Ludlow et al.
11,419,784 B2 8/2022 Jolly et al.
2002/0010495 A1 1/2002 Freed et al.
2002/0049479 A1 4/2002 Pitts
2002/0133194 A1 9/2002 Leelamanit et al.
2003/0093128 A1 5/2003 Freed et al.
2004/0073271 A1 4/2004 Harry et al.
2004/0133133 A1 7/2004 Dreimann et al.
2004/0249320 A1 12/2004 Yamazaki et al.
2004/0267331 A1 12/2004 Koeneman et al.
2005/0049453 A1 3/2005 Faulkner
2005/0049856 A1 3/2005 Baraff
2005/0059909 A1 3/2005 Burgess
2005/0267388 A1 12/2005 Hanna
2006/0030794 A1 2/2006 Nation et al.
2007/0073361 A1 3/2007 Goren et al.
2007/0123950 A1 5/2007 Ludlow et al.
2007/0293926 A1 12/2007 Dunlay et al.
2008/0077192 A1 3/2008 Harry et al.
2008/0195006 A1 8/2008 Stark
2009/0048645 A1 2/2009 Philipp et al.
2009/0054980 A1 2/2009 Ludlow et al.
2009/0187124 A1 7/2009 Ludlow et al.
2010/0016908 A1 1/2010 Martin et al.
2010/0049103 A1 2/2010 Ludlow et al.
2010/0198322 A1 8/2010 Joseph et al.
2010/0241191 A1 9/2010 Testerman et al.
2011/0125212 A1 5/2011 Tyler
2012/0046579 A1 2/2012 Radl et al.
2012/0184883 A1 7/2012 Song et al.
2012/0253236 A1 10/2012 Snow et al.
2012/0296243 A1 11/2012 Ludlow et al.
2012/0302929 A1* 11/2012 Tkachenko ........ A61H 23/0254 601/48
2013/0072834 A1* 3/2013 Afshar ............... A61H 23/0263 601/46
2013/0102937 A1 4/2013 Ehrenreich et al.
2013/0185077 A1 7/2013 Lee et al.
2014/0276270 A1 9/2014 Ludlow et al.
2017/0007497 A1 1/2017 Ludlow
2017/0165101 A1 6/2017 Davidian
2018/0233225 A1 8/2018 Experton et al.
2019/0053968 A1 2/2019 Vergara
2019/0151604 A1* 5/2019 Harper ................... A61H 23/02
2019/0159953 A1* 5/2019 Konczak ................ A61H 1/005
2019/0234412 A1 8/2019 Schwimmer et al.
2019/0262212 A1 8/2019 Schroeder
2019/0262225 A1 8/2019 Gertner et al.
2020/0330323 A1 10/2020 Jolly et al.
2021/0322261 A1 10/2021 Jolly et al.
2021/0322262 A1 10/2021 Jolly et al.
2021/0322263 A1 10/2021 Jolly et al.
2022/0235786 A1 7/2022 Liu et al.
2022/0313543 A1 10/2022 Ludlow et al.
2022/0378650 A1 12/2022 Jolly et al.

FOREIGN PATENT DOCUMENTS

CA 2614072 1/2019
CN 1375268 A 10/2002
CN 101716394 6/2010
CN 111558144 A 8/2020
CN 217853560 U 11/2022
CN 219480547 U 8/2023
EP 0 226 333 A1 6/1987
EP 1917067 1/2007
EP 2334278 6/2011
HK 1117439 1/2009
JP 62-174788 A 7/1987
JP S64-046459 2/1989
JP H06-190017 7/1994
JP H09-084845 3/1997
JP 11-500339 1/1999
JP 2003-111748 4/2003
JP 2006-500994 1/2006
JP 2007-151736 6/2007
JP 2008-520306 6/2008
JP 2008-544832 12/2008
WO WO 92/21407 12/1992
WO WO 97/15349 5/1997
WO WO 2004/028433 4/2004
WO WO 2006/054118 A1 5/2006
WO WO 2007/005582 1/2007
WO WO 2007/123746 11/2007
WO WO 2010/033594 3/2010

(56) References Cited

FOREIGN PATENT DOCUMENTS

| | | | | |
|---|---|---|---|---|
| WO | WO 2016/001393 | | 1/2016 | |
| WO | WO-2019184615 | A1 * | 10/2019 | ............... A61H 1/00 |
| WO | WO 2023/031983 | | 3/2023 | |

OTHER PUBLICATIONS

U.S. Appl. No. 11/993,094 U.S. Pat. No. 8,579,839, filed Oct. 2, 2008 Nov. 12, 2013, Methods for Recovery From Motor Control Via Stimulation to a Substituted Site to an Affected Area.
U.S. Appl. No. 13/492,044, filed Jun. 8, 2012, Systems for Recovery From Motor Control Via Stimulation to a Substituted Site to an Affected Area.
U.S. Appl. No. 14/471,369 U.S. Pat. No. 10,071,016, filed Jun. 8, 2012 Sep. 11, 2018, Systems for Recovery From Motor Control Via Stimulation to a Substituted Site to an Affected Area.
U.S. Appl. No. 12/240,398 U.S. Pat. No. 8,449,445, filed Sep. 29, 2008 May 28, 2013, Device for Volitional Swallowing With a Substitute Sensory System.
U.S. Appl. No. 13/902,263 U.S. Pat. No. 8,852,074, filed Sep. 29, 2008 Oct. 7, 2014, Device for Volitional Swallowing With a Substitute Sensory System.
U.S. Appl. No. 12/211,633 U.S. Pat. No. 8,388,561, filed Sep. 16, 2008 Mar. 5, 2013, Systems and Methods for Recovery From Motor Control Via Stimulation to a Substituted Site to an Affected Area.
U.S. Appl. No. 13/777,907 U.S. Pat. No. 8,808,207, filed Feb. 26, 2013 Aug. 19, 2014, Systems and Methods for Recovery From Motor Control Via Stimulation to a Substituted Site to an Affected Area.
U.S. Appl. No. 13/799,549, filed Mar. 13, 2013, Systems and Methods for Stimulating Swallowing.
U.S. Appl. No. 15/372,211 U.S. Pat. No. 11,344,471, filed Dec. 7, 2016 May 31, 2022, Systems and Methods for Stimulating Swallowing.
U.S. Appl. No. 18/505,788, filed Nov. 9, 2023, Systems and Methods for Stimulating Swallowing.
U.S. Appl. No. 17/660,381 U.S. Pat. No. 11,850,203, filed Apr. 22, 2022 Dec. 26, 2023, Systems and Methods for Stimulating Swallowing.
U.S. Appl. No. 16/853,477, filed Apr. 20, 2020, Vibratory Nerve Exciter.
U.S. Appl. No. 17/305,268 U.S. Pat. No. 11,229,576, filed Jul. 2, 2021 Jan. 25, 2022, Vibratory Nerve Exciter.
U.S. Appl. No. 17/305,280 U.S. Pat. No. 11,419,784, filed Jul. 2, 2021 Aug. 23, 2022, Vibratory Nerve Exciter.
U.S. Appl. No. 17/305,282 U.S. Pat. No. 11,413,214, filed Jul. 2, 2021 Aug. 16, 2022, Methods of Vibrationally Exciting a Laryngeal Nerve.
U.S. Appl. No. 17/887,299 U.S. Pat. No. 11,850,205, filed Aug. 12, 2022 Dec. 26, 2023, Methods of Vibrationally Exciting a Laryngeal Nerve.
U.S. Appl. No. 18/524,927, filed Nov. 30, 2023, Systems for Vibrationally Exciting a Laryngeal Nerve.
U.S. Appl. No. 18/394,539, filed Dec. 22, 2023, Methods and Systems for Stimulating Laryngeal Nerve.
U.S. Appl. No. 18/394,436, filed Dec. 22, 2023, Methods and Systems for Stimulating Thyroid.
Abragam, (1961) The Principles of Nuclear Magnetism, Clarendon Press.
Andersen et al., Modulation of heat evoked nociceptive withdrawal reflexes by painful intramuscular conditioning stimulation, Exp Brain Res, 2006, vol. 174, pp. 755-780.
Aviv et al., "Laryngopharyngeal sensory testing with modified barium swallow as predictors of aspiration pneumonia after stroke", Laryngoscope, 107:1254-1260 (1997).
Aviv et al., "Silent laryngopharyngeal sensory deficits after stroke", Ann Otol Rhinol. Laryngol., 106:87-93 (1997).
Aviv et al., "Supraglottic and pharyngeal sensory abnormalities in stroke patients with dysphagia", Ann Otol Rhinol.Laryngol., 105:92-97 (1996).
Bara-Jimenez et al., "Abnormal somatosensory homunculus in dystonia of the hand", Ann Neurol., 44(5):828-831 (1998).
Bara-Jimenez et al., "Sensory discrimination capabilities in patients with focal hand dystonia", Ann Neural., 47(3):377-380 (2000).
Bhadra et al., Extraction Force and Tissue Change During Removal of a Tined Intramuscular Electrode from Rat Gastrocnemius, Annals of Biomedical Engineering, Jun. 2006, vol. 34, Issue No. 6, pp. 1042-1050.
Bidus et al., "Effects of Adductor Muscle Stimulation on Speech in Abductor Spasmodic Cysphonia", The Laryngoscope, 110:1943-1949 (2000).
Bielamowicz et al., "Effects of botulinum toxin on pathophysiology in spasmodic dysphonia", Ann Otol Rhinol Laryngol, 109: 194-203 (2000).
Boyd et al., "Neurotrophic factors and their receptors in axonal regeneration and functional recovery after peripheral nerve injury", Molecular Neurobiology, 27(3), 277-324, (2003). https://doi.org/10.1385/mn:27:3:277.
Burnett et al., "Laryngeal elevation achieved by neuromuscular stimulation at rest", J Appl Physiol, 94(1): 128-134 (2003).
Burnett et al., "Self-Triggered Functional Electrical Stimulation During Swallowing", J Neurophysiol, 94(6):4011-4018 (2005).
Caetano et al., Evidence of vibrotactile input to human auditory cortex, Neurolmage, 2006, vol. 29, pp. 15-28.
Celichowski et al., The time course of the last contractions during incompletely fused tetani of motor units in rat skeletal muscle, Acta Neurobiol. Exp., 2002, vol. 62, pp. 7-17.
Chen et al., "Role of macrophages in Wallerian degeneration and axonal regeneration after peripheral nerve injury", Acta Neuropathologica, 130(5), 605-618, (2015). https://doi.org/10.1007/s00401-015-1482-4.
Chou et al., Predicting optimal electrical stimulation for repetitive human muscle activation, Journal of Electromyography and Kinesiology, 2005, vol. 15, pp. 300-309.
Conforto et al., "Increase in hand muscle strength of stroke patients after somatosensory stimulation", Ann Neurol, 51(1): 122-125 (2002).
Daly et al., "Performance of an intramuscular electrode during functional neuromuscular stimulation for gait training post stroke", Journal of Rehabilitation Research and Development, 38(5):513-526 (2001).
Davis et al., Quantitative analysis of laryngeal mechanosensitivity in the cat and rabbit, J. Physiol., 1987, vol. 388, pp. 467-485.
De Larminat et al., "Alteration in swallowing reflex after extubation in intensive care unit patients", Crit Care Med, 23(3):486-490 (1995).
De Nil et al., "Kinaesthetic acuity of stutterers and non-stutterers for oral and non-oral movements", Brain, 114:2145-2158 (1991).
Dick et al., "Interaction between central pattern generators for breathing and swallowing in the cat", J Physiol, 465:715-730 (1993).
Experia™: The Next Generation of VitalStim® Therapy brochure, 2007 Encore Medical, L.P. and Affiliates, 2 pages.
Ferrante et al., "Regulation of macrophage polarization and wound healing", Advances in Wound Care, 1(1), 10-16, (2012). https://doi.org/10.1089/wound.2011.0307.
Folstein et al., "Mini-mental state. A practical method for grading the cognitive state of patients for the clinician", J Psychiatr Res, 12(3):189-198 (1975).
Fraser et al., "Differential changes in human pharyngoesophageal motor excitability induced by swallowing, pharyngeal stimulation, and anesthesia", Am J Physiol Gastrointest Liver Physiol, 285(1):G137-144 (2003).
Freed et al., "Electrical Stimulation for Swallowing Disorders Caused by Stroke", Respiratory Care, 46(5):466-474 (2001).
Gensel et al., "Macrophage activation and its role in repair and pathology after spinal cord injury", Brain Research, 1619, 1-11, (2015). https://doi.org/10.1016/j.brainres.2014.12.045.

(56) References Cited

OTHER PUBLICATIONS

Grottel et al., The Influence of changes in the stimulation pattern on force and fusion in motor units of the rat medial gastrocnemius muscle, Exp Brain Res, 1999, vol. 127, pp. 298-306.
Hägg et al., "Effects of motor and sensory stimulation in stroke patients with long-lasting dysphagia", Dysphagia, 19:219-230 (2004).
Hamdy et al., "Modulation of human swallowing behaviour by thermal and chemical stimulation in health and after brain injury", Neurogastroenterol Motil, 15(1):69-77 (2003).
Handa et al., "Development of Percutaneous Intramuscular Electrode for Multichannel FES System", IEEE Transactions on Biomedical Engineering, 36(7):705-710.
Haslinger et al., "Silent event-related fMRI reveals reduced sensorimotor activation in laryngeal dystonia", Neurology, 65:1562-1569 (2005).
Hrycyshyn et al., "Electromyography of the Oral Stage of Swallowing in Man", Am. J. Anat., 133:333-340 (1972).
Humbert et al., "The effect of surface electrical stimulation on hyolaryngeal movement in normal individuals at rest and during swallowing", J Appl Physiol, 101:1657-1663 (2006).
Humbert et al., The Effect of Surface Electrical Stimulation on Vocal Fold Posiiton, The Laryngoscope, Jan. 2008, vol. 118, pp. 14-19.
Jafari et al., "Sensory regulation of swallowing and airway protection: a role for the internal superior laryngeal nerve in humans", J Physiol, 550(Pt I):287-304 (2003).
Jean, "Control of the central swallowing program by inputs from the peripheral receptors. A review", J Auton. Ner. Syst., 10:225-233 (1984).
Jean, Brain Stem Control of Swollowing: Neuronal Network and Cellular Mechanisms, Physiological Reviews, Apr. 2001, vol. 81, Issue No. 2, pp. 929-969.
Kamarunas et al., "Vibration overlying the larynx increases swallowing in chronic oropharyngeal dysphagia," Original Research, pp. 1-41, Jul. 17, 2017.
Kesar et al., Effect of frequency and pulse duration on human muscle fatigue during repetitive electrical stimulation, Exp Physiol, 2006, vol. 91, Issue No. 6, pp. 967-976.
Kimberley et al., "Electrical stimulation driving functional improvements and cortical changes in subjects with stroke", Experimental Brain Research, 2004, vol. 154, pp. 450-460.
Kitagawa et al., Facilitation of reflex swallowing from the pharynx and larynx, Journal of Oral Science, 2009, vol. 51, Issue No. 2, pp. 167-171.
Knutson et al., Electrode fracture rates and occurrences of infection and granuloma associated with percutaneous intramuscular electrodes in upper-limb functional electrical stimulation applications, Journal of Rehabilitation Research and Development, 2002, vol. 39, Issue No. 6, pp. 671-683.
Leelamanit et al., "Synchronized electrical stimulation in treating pharyngeal dysphagia", Laryngoscope, 112(12):2204-2210 (2002).
Li et al., "Growth factors-based therapeutic strategies and their underlying signaling mechanisms for peripheral nerve regeneration", Acta Pharmacologica Sinica, 41(10), 1289-1300, (2020). https://doi.org/10.1038/s41401-019-0338-1.
Logemann et al., "Effects of a sour bolus on oropharyngeal swallowing measures in patients with neurogenic dysphagia", J Speech Hear Res, 38(3):556-563 (1995).
Logemann, "Noninvasive approaches to deglutitive aspiration", Dysphagia, 8(4):331-333 (1993).
Loucks et al., "Laryngeal muscle responses to mechanical displacement of the thyroid cartilage in humans", J Appl Physiol, 99(3):922-930 (2005).
Lowell et al., "Sensory stimulation activates both motor and sensory components of the swallowing system", Neurolmage, 42:285-295 (2008).
Ludlow et al., "Chronic Intermittent Stimulation of the Thyroarytenoid Muscle Maintains Dynamic Control of Glottal Adduction", Muscle and Nerve, 23:44-57 (2000).
Ludlow et al., "Dynamic aspects of phonatory control in spasmodic dysphonia", J Speech Hear Res, 30:197-206 (1987).
Ludlow et al., "Effects of Surface Electrical Stimulation Both at Rest and During Swallowing in Chronic Pharyngeal Dysphagia", Dysphagia, 22:1-10 (2007).
Ludlow et al., "Three-Dimensional Changes in the Upper Airway During Neuromuscular Stimulation of Laryngeal Muscles", Journal of Artificial Organs, 23:463-465 (1999).
Lundy et al., "Aspiration: Cause and Implications", Otolaryngol Head Neck Surg., 120(4):474-478 (1999).
Ma et al., "Accelerating axonal growth promotes motor recovery after peripheral nerve injury in mice", Journal of Clinical Investigation, 121(11), 4332-4347, (2011). https://doi.org/10.1172/jci58675.
Marsolais et al., "Implantation techniques and experience with percutaneous intramuscular electrodes in the lower extremities", J. Rehabil. Res. Dev., 23(3):1-8 (1986).
Mifflin, "Intensity and frequency dependence of laryngeal afferent inputs to respiratory hypoglossal motoneurons", J.Appl Physiol, 83:1890-1899 (1997).
Mokarram et al., "Effect of modulating macrophage phenotype on Peripheral Nerve Repair", Biomaterials, 33(34), 8793-8801, (2012). https://doi.org/10.1016/j.biomaterials.2012.08.050.
Mortimer et al., "Intramuscular Electrical Stimulation: Tissue Damage", Ann. Biomed. Eng., 8:235-244 (1980).
Mortimer et al., Vibrotactile transduction and transducers, J. Acoust. Soc. Am., May 2007, vol. 121, Issue No. 5, pp. 2970-2977.
Mulheren et al., "Vibration over the larynx increases swallowing and cortical activation for swallowing", J. Neurophysiol., 118: 169-1708, Jul. 5, 2017.
Nishino et al., "Cough and other reflexes on irritation of airway mucosa in man", Pulm Pharmacol, 9(5-6):285-292 (1996).
Ootani et al., "Convergence of afferents from the SLN and GPN in cat medullary swallowing neurons", Brain Res Bull, 37(4):397-404 (1995).
Pan et al., "Effects of neurotoxic and neuroprotective agents on peripheral nerve regeneration assayed by time-lapse imaging in vivo", The Journal of Neuroscience, 23(36), 11479-11488, (2003). https://doi.org/10.1523/jneurosci.23-36-11479.2003.
Park et al., "A pilot exploratory study of oral electrical stimulation on swallow function following stroke: an innovative technique", Dysphagia, 12(3):161-166 (1997).
Pertovaara, Modification of human pain threshold by specific tactile receptors, Acta Physiol Scand, 1979, vol. 107, pp. 339-341.
Peurala et al., "Cutaneous electrical stimulation may enhance sensorimotor recovery in chronic stroke", Clin Rehabil., 16:709-716 (2002).
Pick et al., "Pulmonary aspiration in a long-term care setting: clinical and laboratory observations and an analysis of risk factors", J Am Geriatr Soc, 44(7):763-768 (1996).
Pommerenke, "A study of the sensory areas eliciting the swallowing reflex", American Journal of Physiology, 84(1):36-41 (1927).
Portone et al., "A review of patient adherence to the recommendations for voice therapy", J. Voice, 22:192-196 (2008).
Power et al., "Changes in pharyngeal corticobulbar excitability and swallowing behavior after oral stimulation", Am J Physiol Gastrointest Liver Physiol, 286(1):G45-50 (2004).
Power et al., "Evaluating oral stimulation as a treatment for Dysphagia after stroke", Dysphagia, 21(1):49-55 (2006).
Robbins et al., "Swallowing and dysphagia rehabilitation: translating principles of neural plasticity into clinically orientated evidence", J Speech Lang. Hear. Res., 51:S276-300 (2008).
Scheiner et al., "Design and Clinical Application of a Double Helix Electrode for Functional Electrical Stimulation", IEEE Transactions of Biomedical Engineering, 41(5):425-431 (1994).
Sedory-Holzer et al., "The swallowing side effects of botulinum toxin type A injection in spasmodic dysphonia", Laryngoscope, 106:86-92 (1996).
Setzen et al., "The association between laryngopharyngeal sensory deficits, pharyngeal motor function, and the prevalence of aspiration with thin liquids", Otolaryngol Head Neck Surg, 128(1):99-102 (2003).

(56) References Cited

OTHER PUBLICATIONS

Soriano et al., "Anatomy, Head and Neck: Larynx Nerves", [Updated Sep. 18, 2022]. In: StatPearls [Internet]. Treasure Island (FL): StatPearls Publishing; Jan. 2023. Available from: https://www.ncbi.nlm.nih.gov/books/NBK557742/.
Spiro et al., "Activation and Coordination Patterns of the Suprahyoid Muscles During Swallowing", Laryngoscope, 104:1376-1382 (1994).
Stanic et al., "Multichannel Electrical Stimulation for Correction of Hemiplegic Gait", Scand J. Rehabil. Med., 10:75-92 (1978).
Strojnik et al., "Treatment of Drop Foot Using an Implantable Peroneal Underknee Stimulator", Scand J. Rehabil. Med., 19:37-43 (1987).
Struppler et al., "Modulation of sensorimotor performances and cognition abilities induced by RPMS: clinical and experimental investigations", Suppl Clin Neurophysiol., 56:358-367 (2003).
Sundgren et al., "Elevation of the larynx on normal and abnormal cineradiogram", The British Journal of Radiology, 66:768-772(1993).
Theurer et al., "Oropharyngeal stimulation with air-pulse trains increases swallowing frequency in healthy adults", Dysphagia, 20(4):254-260 (2005).
Uslusoy et al., "Regeneration of mechanical sciatic nerve injury is affected by cold and heat exposure: involvements of the TRPM2 and TRPM8 channels", Int J Burns Trauma, 10(6): 279-295 (Dec. 15, 2020).
Van Dijk et al., "Effects of transcutaneous electrical nerve stimulation (TENS) on non-pain related cognitive and behavioural functioning", Rev Neurosci., 13:257-270 (2002).
Vidyasagar et al., "Heat shock protein 27 (HSP27): Biomarker of disease and Therapeutic Target", Fibrogenesis & Tissue Repair, 5(1), (2012). https://doi.org/10.1186/1755-1536-5-7.
Wagner et al., "Vibratory stimulation enhances thyroid epithelial cell function", Biochemistry and Biophysics Reports, 8, 376-381, (2012). https://doi.org/10.1016/j.bbrep.2016.10.008.
Wakeling et al., Muscle activity damps the soft tissue resonance that occurs in response to pulsed and continuous vibrations, J Appl Physiol, May 17, 2002, vol. 93, pp. 1093-1103.
Waters et al., "Functional Electrical Stimulation of the Peroneal Nerve for Hemiplegia", The Journal of Bone and Joint Surgery, 67:792-793 (1985).
Witteveen et al., Vibro- and Electrotactile User Feedback on Hand Opening for Myoelectric Forearm Prostheses, IEEE Transactions on Biomedical Engineering, Aug. 2012, vol. 59, Issue No. 8, pp. 2219-2226.
Yim et al., "Disentangling glial diversity in peripheral nerves at single-nuclei resolution", Nature Neuroscience, 25(2), 238-251, (2022). https://doi.org/10.1038/s41593-021-01005-1.

* cited by examiner

METHODS AND SYSTEMS FOR VIBRATIONALLY EXCITING A LARYNGEAL NERVE

CROSS-REFERENCE TO RELATED APPLICATIONS

The application is a continuation of U.S. patent application Ser. No. 17/887,299, filed Aug. 12, 2022, which is a continuation of U.S. patent application Ser. No. 17/305,282, filed Jul. 2, 2021, now U.S. Pat. No. 11,413,214, issued Aug. 16, 2022 which is a continuation of U.S. patent application Ser. No. 16/853,477, filed Apr. 20, 2020, now abandoned, which claims the priority of U.S. Provisional Patent Application No. 62/836,195, filed Apr. 19, 2019, the disclosures of each of which is incorporated in its entirety herein by reference.

BACKGROUND

The present invention relates to human tissue stimulation and in particular to noninvasive vibration on the neck overlying the larynx to excite the laryngeal nerve to augment or reestablish swallowing control during rehabilitation of patients with dysphagia, and to treat voice disorders affecting the function of the laryngeal system, such as spasmodic dysphonia, and to treat chronic cough.

Dysphagia is a major swallowing disorder that effects the central nervous system, and the peripheral nervous system, thereby weakening neuromuscular control and effectively reducing the ability to properly swallow. Dysphagia may occur at any time across the lifespan. This impairment has many potential causes, including but not limited to neurologic disorders, degenerative disease processes, and anatomical changes. Dysphagia is characterized by difficulty swallowing, impaired ability to protect the airway during swallowing (penetration and aspiration), and impaired ability to transport a bolus of food or liquid from the mouth to the stomach. These difficulties may contribute to a risk for respiratory complications (pneumonia), dehydration, malnutrition, and may restrict social eating. Because of these negative impacts, it also may significantly impact quality of life for an individual.

An occasional cough is normal in that it helps to clear irritants and secretions from the lungs; however, when a cough lasts longer than eight weeks in adults and begins to interfere with daily functions, such as sleep and bladder control, then it may be diagnosed as a chronic cough. In children, this diagnosis may occur after four weeks of coughing. Chronic cough occurs in the upper airway of the respiratory system, and the condition may be caused by co-morbidities, such as asthma, post-nasal drip, or reflux. However, the mechanism is unknown. The cough reflex may be impaired by a disease condition that weakens the cough which could lead to muscle weakness or paralysis, or it may be secondary to laryngeal nerve involvement.

Spasmodic dysphonia is a disorder that may occur with neurological disorders or disease processes that impact laryngeal function and muscles of the voice. This disorder of the laryngeal system causes the muscles involved in voicing to periodically spasm, triggering increased tension and a distortion of the voice. The spasms cause interruptions and breaks in the voice. Causes of spasmodic dysphonia are unknown but may relate to such processes as anxiety, infection, or direct injury to the larynx. It is more common in women and occurs most often between the ages of 30-50 years.

Any neurologic disease or process that impacts laryngeal function may negatively impact swallowing, voicing, and airway functions such as cough and throat clear, or any function that originates within or requires function of the laryngeal system. Various functions within the laryngeal system occur due to stimulation of the afferent pathways which transmit impulses to the brain and are then interpreted for communication with the efferent system for movement. Current treatment for an impairment or changes of laryngeal function that is caused by various neurological disorders or laryngeal injury are typically long-term behavioral therapy or invasive treatment with the injection of foreign materials or medications into the muscles, nerves, or tissues of the larynx. However, various disorders, such as dysphagia, chronic cough, and voicing disorders, may be improved by innervation of the afferent system within the larynx including the branches of the vagus nerve, such as the recurrent laryngeal, superior laryngeal, and pharyngeal branches, and vibration is known to relax muscles and to provide stimulation to tissues being innervated offering an alternative treatment.

U.S. Pat. No. 8,388,561 describes a vibrotactile stimulator having a band 101 worn around a patient's neck and including a vibrator 102 positionable over the larynx to provide stimulation generally centered on the patient's neck. The vibrator 102 is an electric motor spinning an offset weight. While the '561 patent provides a potential method for addressing dysphagia, there remains a need for improved dysphagia therapy devices.

SUMMARY

The present invention addresses the above and other needs by providing a vibrating laryngeal nerve exciting device which includes a collar holding a bridge, or a neckband, pressing soft tissue nerve exciters against a patient's neck providing a source of vibrations to stimulate the branches of the vagus nerve, such as the recurrent laryngeal, superior laryngeal, and pharyngeal branches. At least one exciter, and preferably two exciters, provide vibrations preferably adjustable between 30 Hz and 200 Hz and more preferably between 70 and 110 Hz and sufficiently strong to penetrate to the laryngeal nerve, for example, a pressure of 2-4 kpa or a vibration amplitude of 0.15 mm to 0.25 mm. The exciters may be held by the collar circling the neck, or by the neck band partially circling the neck. The therapy system includes a Personal Digital Assistant (PDA) device and software which wirelessly connects, monitors, and triggers the device. The system may be used to treat dysphagia, chronic cough, and spasmodic dysphonia.

In accordance with one aspect of the invention, there is provided software (e.g., a smartphone application) which wirelessly connects and triggers the device, for example, through a Bluetooth® protocol. The software sets the frequency of the device, intensity, therapy time, vibration time, duration of rest period between vibration, and allows for patients to provide feedback about the therapy. A general state of health section allows the patient to diary how the patient is feeling before and after the therapy. The software allows clinicians to monitor the patient's progress. The clinician can see the device settings (frequency of the device, intensity, therapy time, vibration time, duration of rest period between vibration), number of uses, whether therapy was completed, and the patient's feedback diary.

BRIEF DESCRIPTION OF THE DRAWINGS

The above and other aspects, features and advantages of the present invention will be more apparent from the following more particular description thereof, presented in conjunction with the following drawings.

Corresponding reference characters indicate corresponding components throughout the several views of the drawings.

DETAILED DESCRIPTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1C:
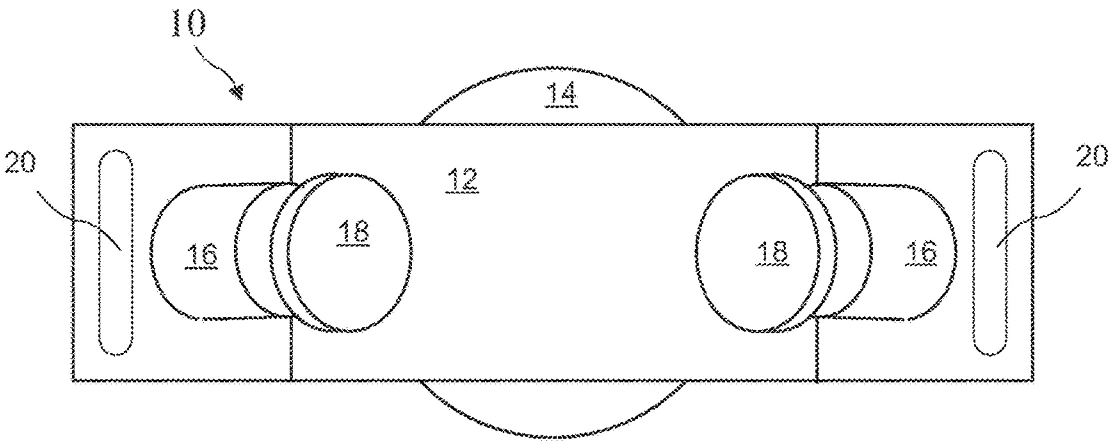
FIG. 1C shows a rear view of the laryngeal nerve exciter according to the present invention.
Figure 1B:
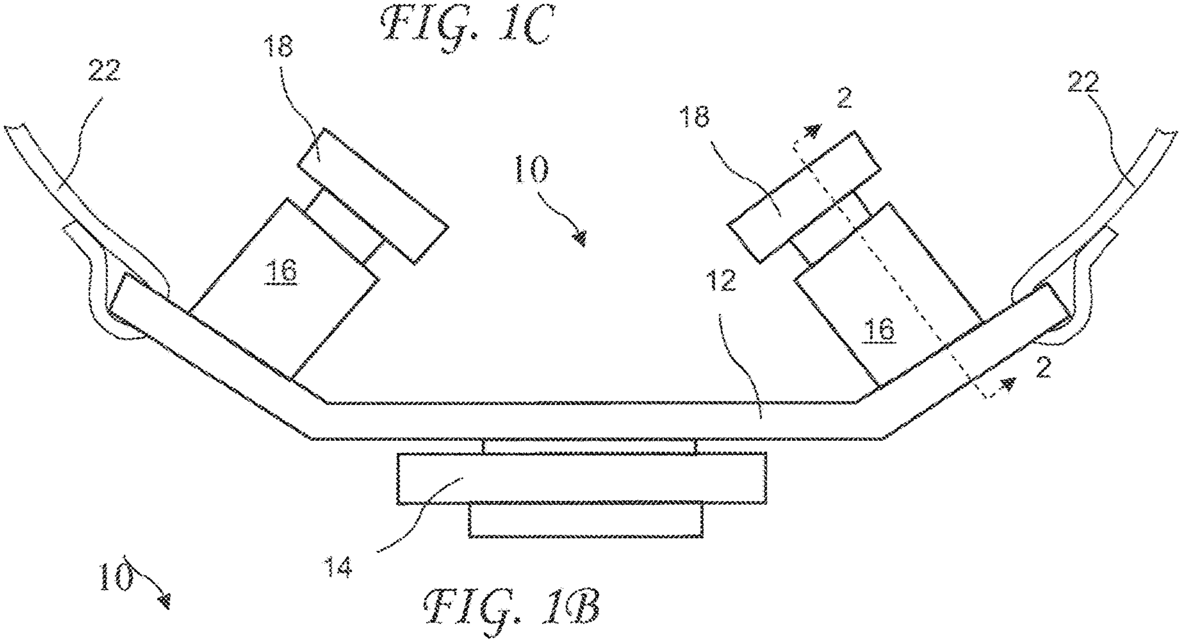
FIG. 1B shows a top view of the laryngeal nerve exciter according to the present invention.
Figure 1A:
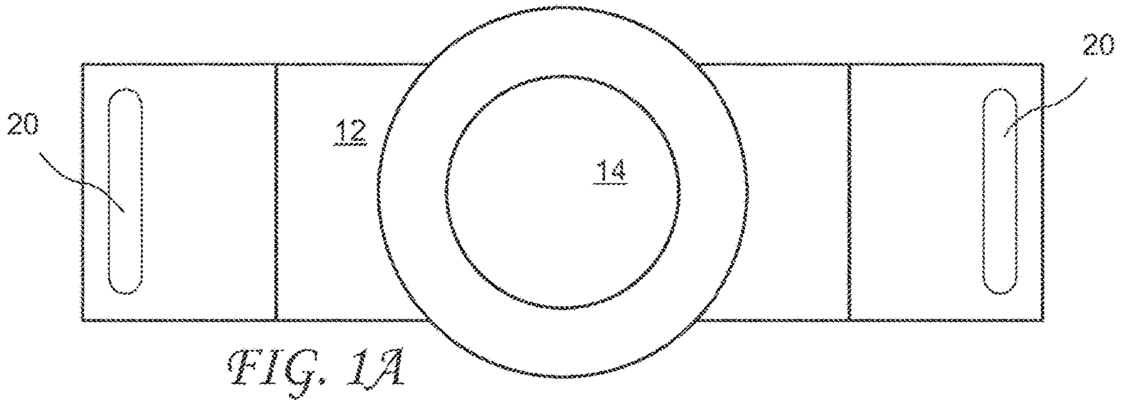
FIG. 1A shows a front view of a laryngeal nerve exciter according to the present invention.

A front view of a laryngeal nerve exciter 10 according to the present invention is shown in FIG. 1*a*, a top view of the laryngeal nerve exciter 10 is shown in FIG. 1B, and a rear view of the laryngeal nerve exciter 10 is shown in FIG. 1C. The laryngeal nerve exciter 10 includes a bridge 12, an exciter 14, effector sleeves 16, end effectors 18, strap slots 20, and a strap 22. The exciter 14 is preferably a solenoid or a voice coil, or any device capable of generating vibrations at various frequencies, for example, vibrations between 30 and 200 Hz and preferably between 70 and 110 HZ and sufficiently strong to reach the laryngeal nerve for example, a pressure of 2-4 kpa or a vibration amplitude of 0.15 mm to 0.25 mm.

Figure 2:
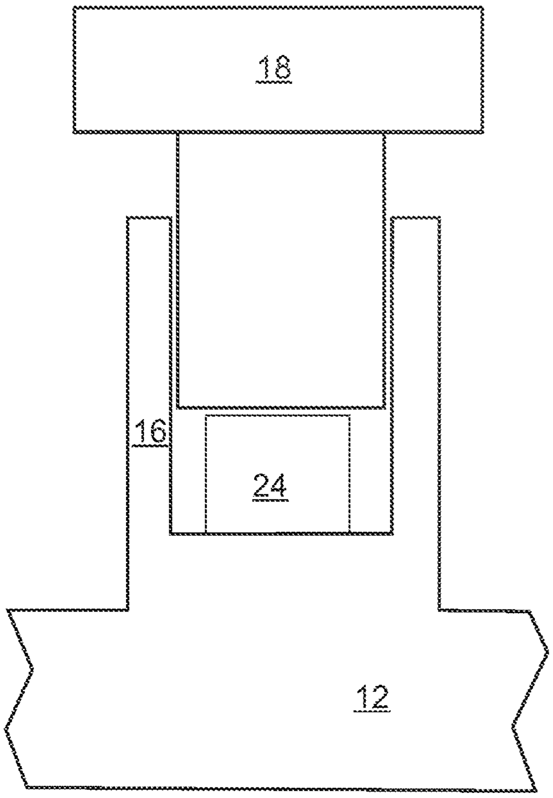
FIG. 2 shows an end effector of the laryngeal nerve exciter according to the present invention.

The end effector 18 of the laryngeal nerve exciter 10 is shown in FIG. 2. A force sensor 24 resides under each end effector 18 and provides force information to allow adjusting the tightness of the strap 22.

Figure 3:
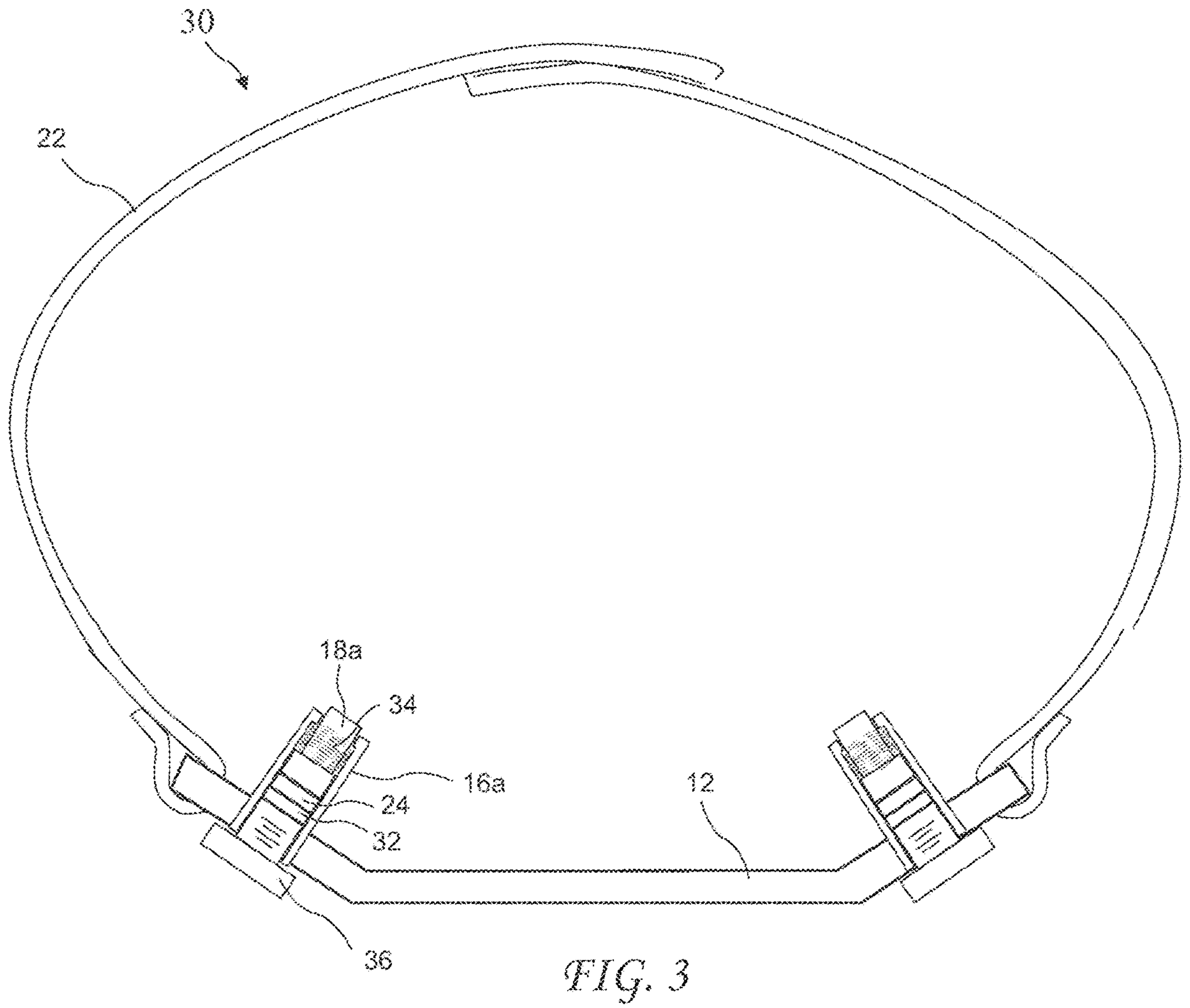
FIG. 3 shows a top view of a second embodiment of a laryngeal nerve exciter according to the present invention.

A top view of a second embodiment of a laryngeal nerve exciter 30 is shown in FIG. 3. The laryngeal nerve exciter 30 includes end effectors 18*a* held inside sleeves 16*a* and springs (or a resilient material) 34 holding the end effectors 18*a* against transducers 32. An adjust screw 36 presses the transducer 32 and end effector 18*a* against the spring 34 allowing adjustment of the end effectors 18*a* against the patient's neck without adjusting the strap 22. The transducers 32 may both vibrate the end effectors 18*a* to stimulate the laryngeal nerve and may sense a patient's attempt to swallow, and may sense stimulation by the other end effector 18*a*. The laryngeal nerve exciter 30 may include the force sensor 24 under the effector 16*a*. In another embodiment, the end effectors 18*a* may be fixedly attached to the moving part of the transducers 32 and no spring 34 is required.

Figure 4:
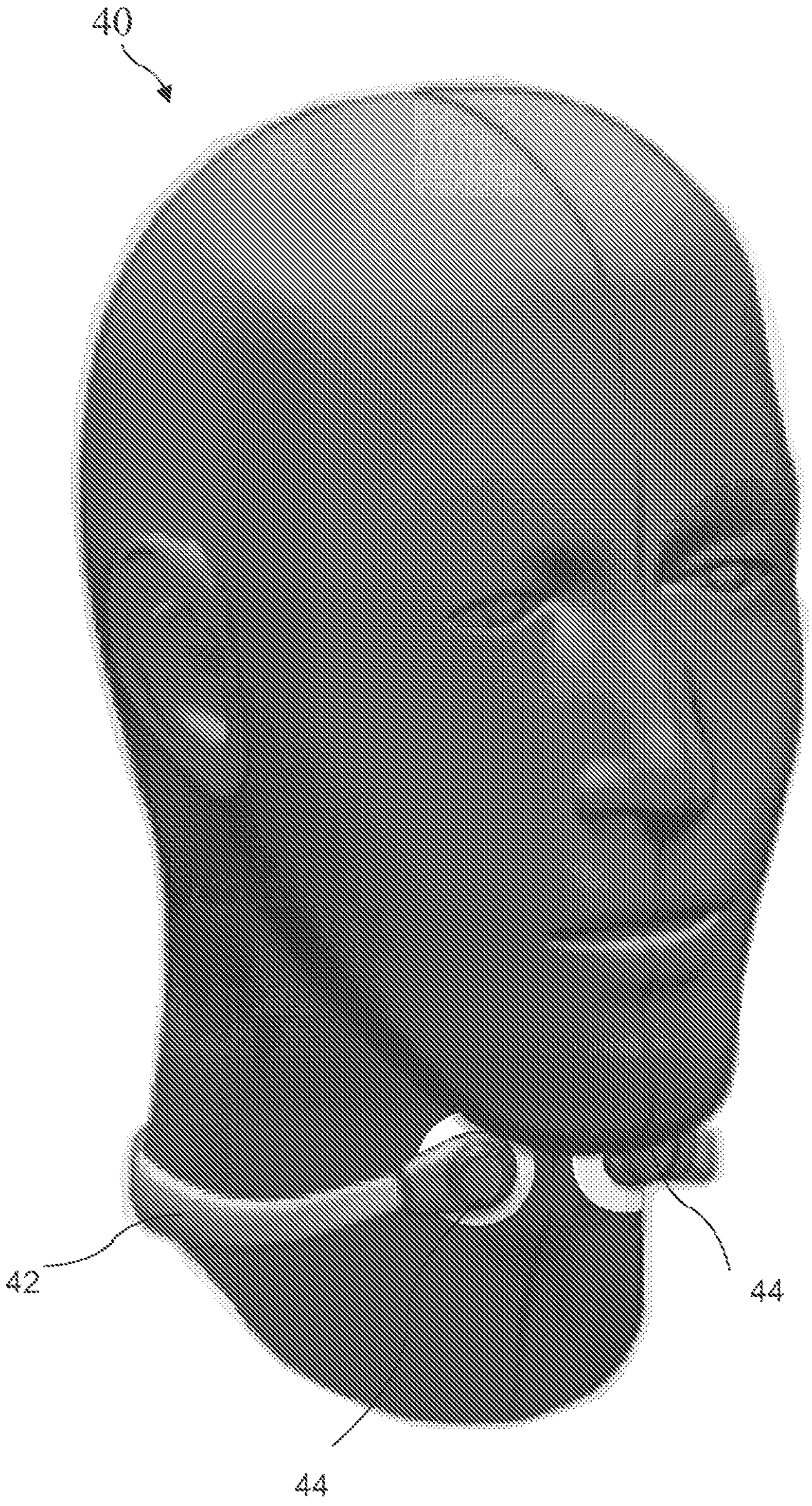
FIG. 4 shows a neckband laryngeal nerve exciter according to the present invention on a patent.

FIG. 4 shows a neckband laryngeal nerve exciter (neckband trainer) 42 on a patient 40. The neckband trainer 42 does not press against the patient's throat providing greater comfort for the patient. Two exciters 44 are pressed against sides of the neck. The exciters 44 preferably receive up to 10 Watts (five Watts per exciter). The neckband trainer 42 provides pressure to the area where the exciters 44 contact the neck. The force of the exciters 44 against the neck is measured and an alarm is generated if the force exceeds a threshold.

Figure 5:
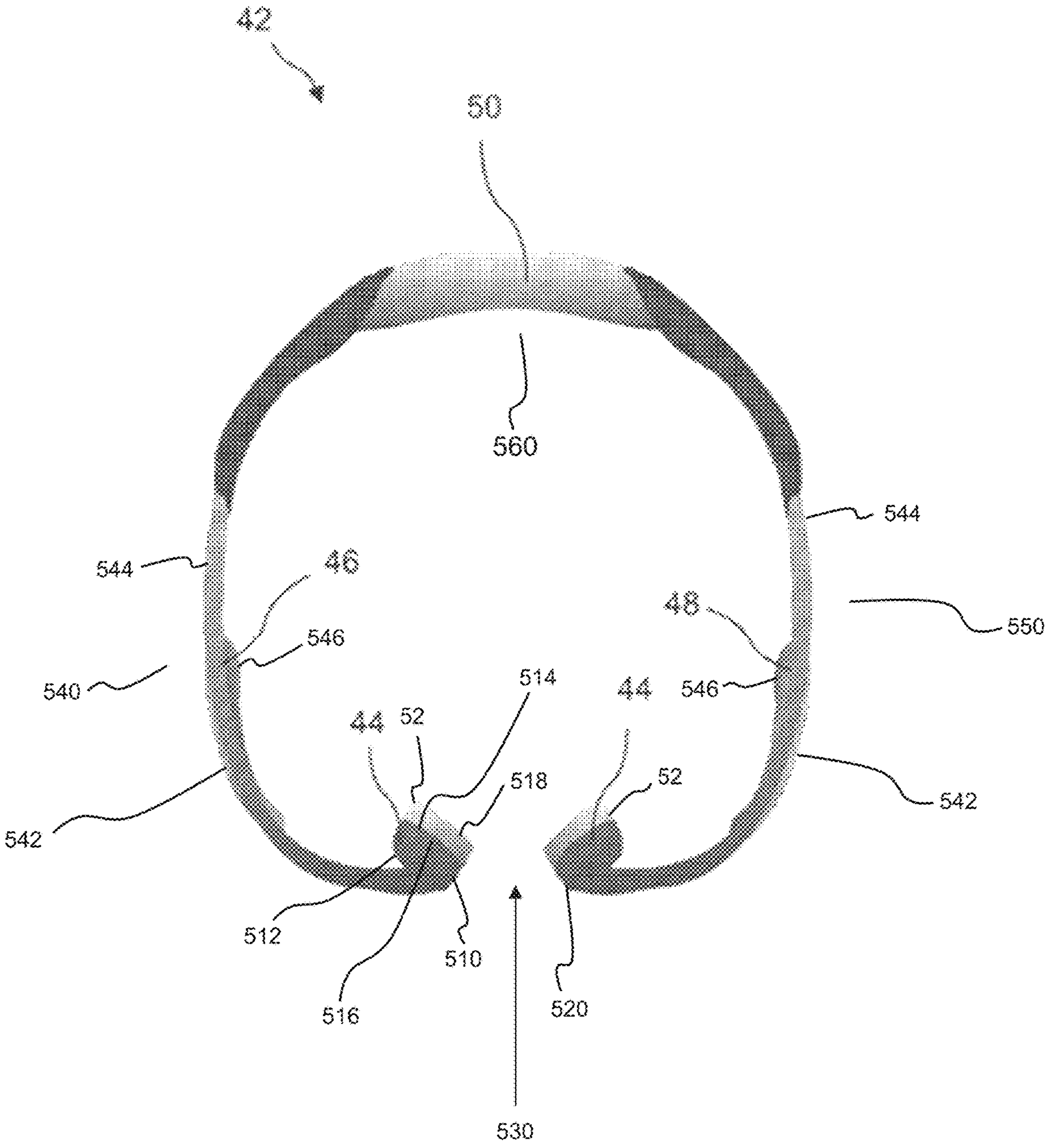
FIG. 5 shows a top view of the neckband laryngeal nerve exciter according to the present invention.
Figure 6:
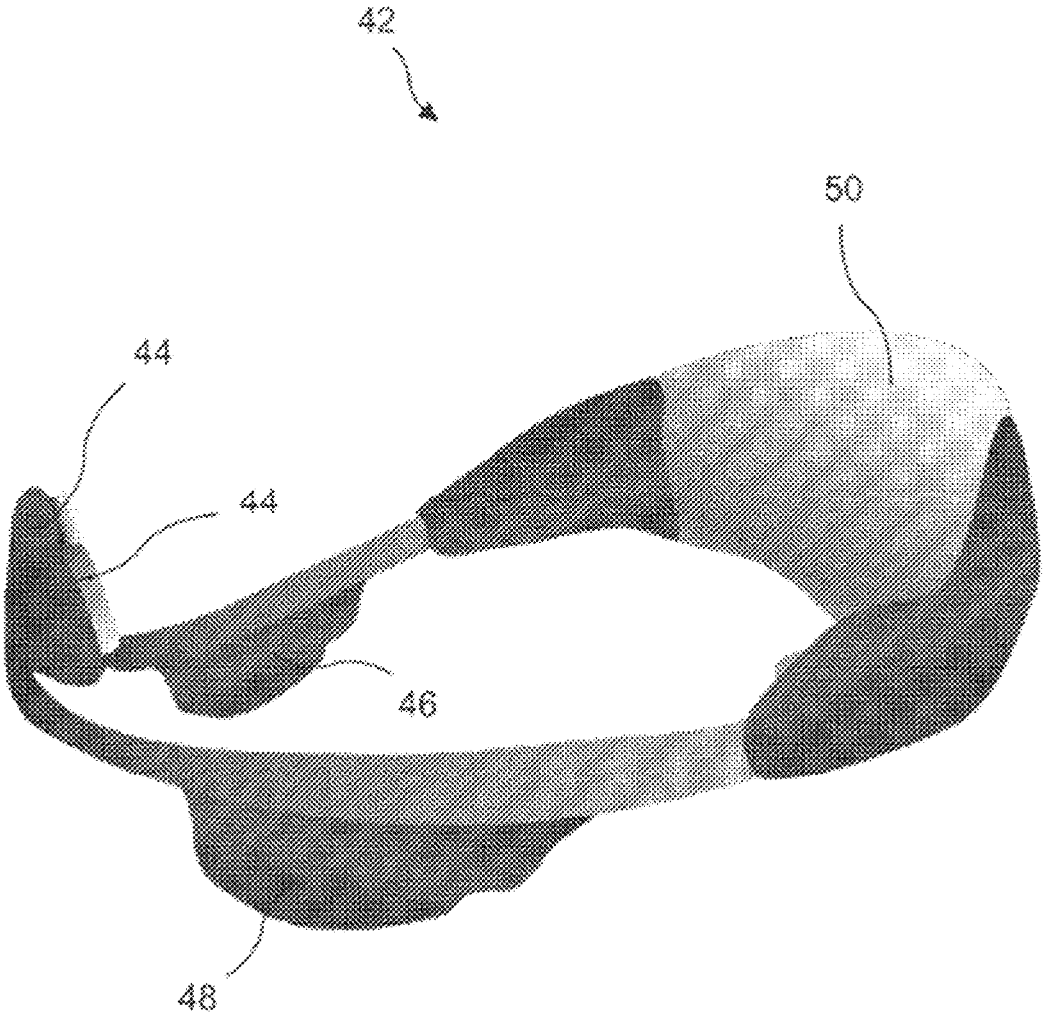
FIG. 6 shows a perspective view of the neckband laryngeal nerve exciter according to the present invention.

FIG. 5 shows a top view of the neckband trainer 42 and FIG. 6 shows a perspective view of the neckband trainer 42. The neckband trainer 42 includes the exciters 44, circuits 46 and 48, and a battery compartment 50. The neckband trainer 42 includes a charging port for charging batteries and is adjustable for individual patients. The neckband trainer 42 may include a first free end 510, a second free end 520, a first side portion 540, a second side portion 550, and a center portion 560. The first free end 510 and the second free end 520 form an open front 530. Each exciter 44 may include a first surface 512 coupled to the first free end 510 and a second surface 514 opposing the first surface 512. Each of the first side portion 540 and the second side portion 550 may include a first region 542 and a second region 544 closer to the center portion 560 than the first region 542. Each first region 542 may include a housing 546 mounted thereon and accommodate a first electrical circuit 46 or a second electrical circuit 48. Each first region 542 may be larger in size than each second region 544 due to the housing 546. The neckband trainer 42 may also include a first adhesive pad and a second adhesive pad 52. Each adhesive pad 52 may include a first surface 516 respectively coupled to the second surface 514 of each of the first exciter or the second exciter 44, and a second surface 518 opposing the first surface 516 of each of first adhesive pad or the second adhesive pad 52.

Figure 7:
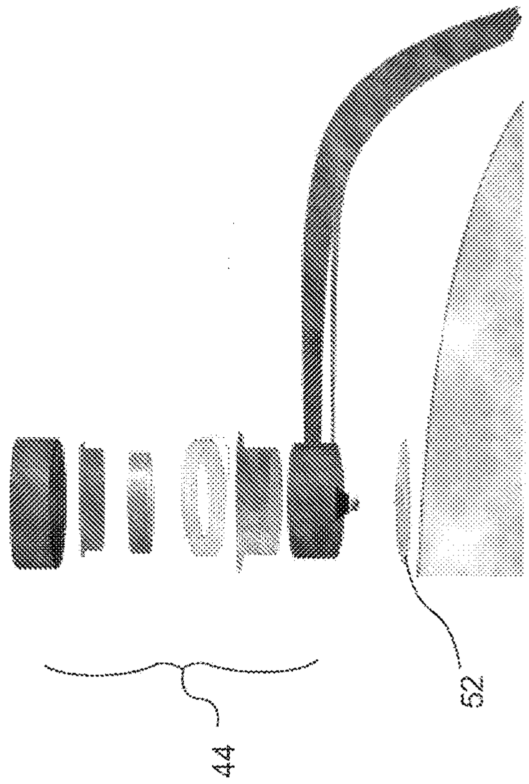
FIG. 7 shows a nerve exciter of the neckband laryngeal nerve exciter according to the present invention.

FIG. 7 shows a nerve exciter 44 of the neckband laryngeal nerve exciter.

Figure 8:
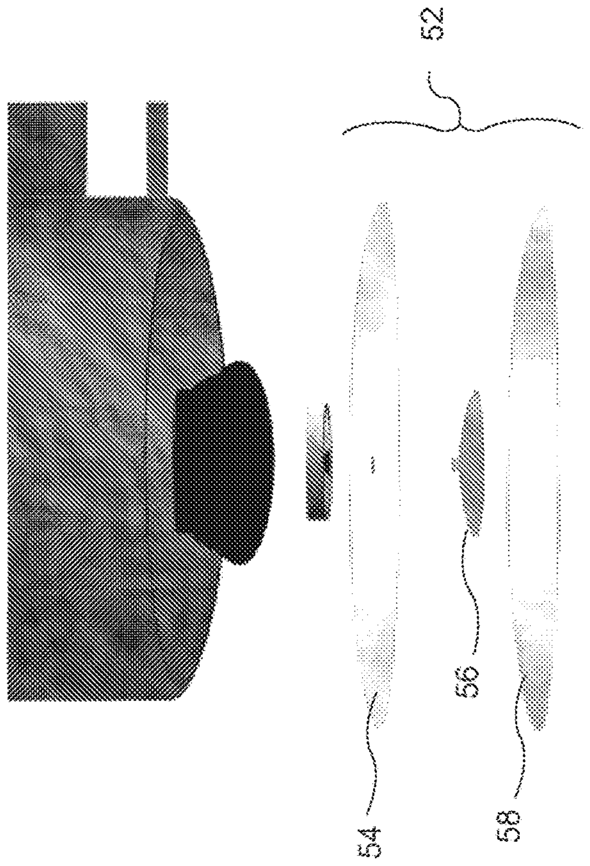
FIG. 8 shows an adhesive pad of the neckband laryngeal nerve exciter according to the present invention.

FIG. 8 shows an adhesive pad 52 of the neckband trainer 42. The adhesive pad 52 comprises a top adhesive pad 54, a plastic snap 56, and a bottom adhesive pad 58. The exciter 44 snaps onto the adhesive pad 52 to retain the exciter 44 against the patient's neck.

Figure 9:
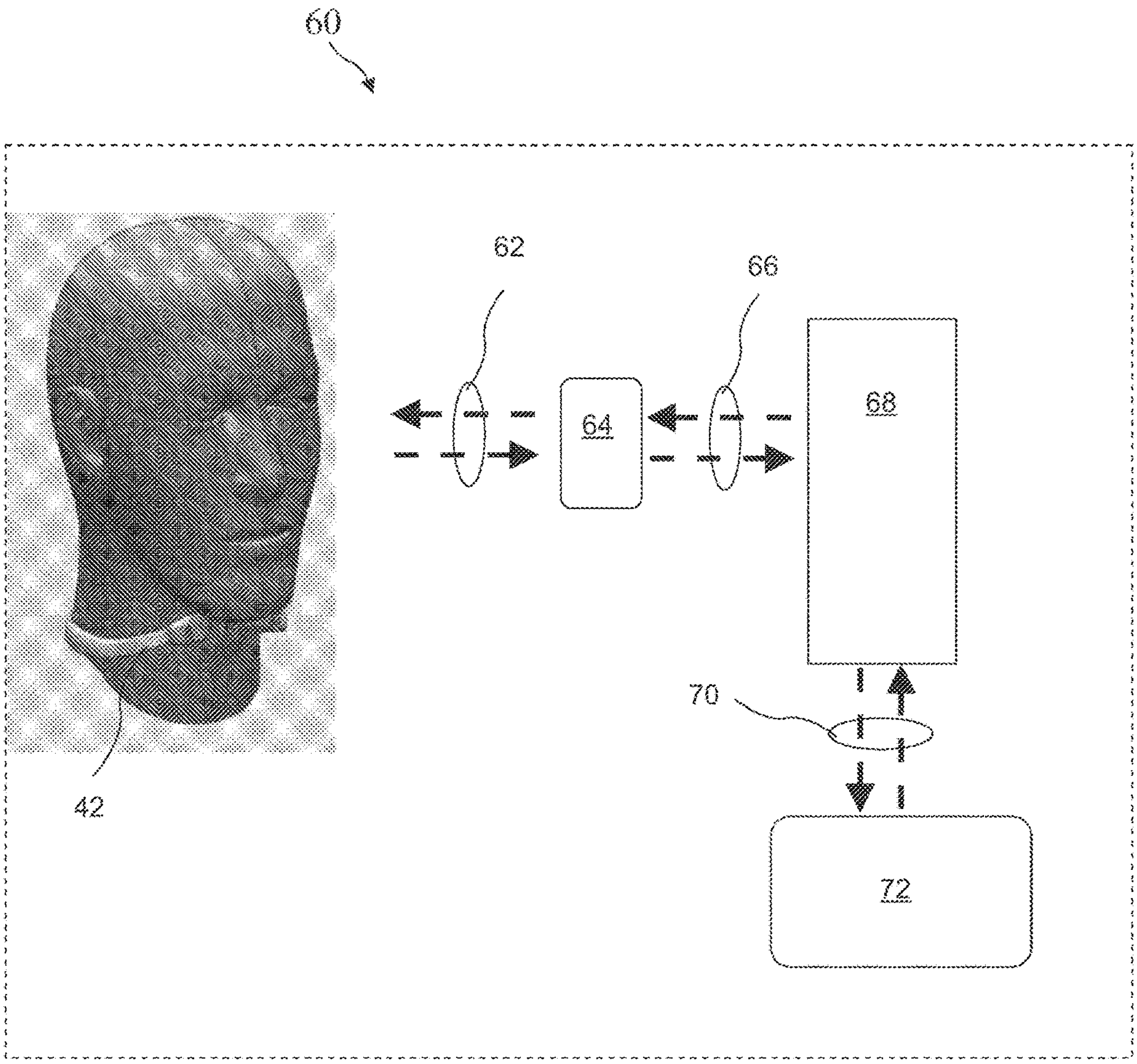
FIG. 9 shows a laryngeal nerve exciting system according to the present invention.

A laryngeal nerve exciter system 60 is shown in FIG. 9. The system 60 utilizes a software Application (App) residing in a Personal Digital Assistant (PDA) 64 which triggers, and monitors the neckband trainer 42 through a Bluetooth® interface 62. The interface 62 may include frequency, intensity, therapy time, vibration time, duration of rest period between vibration, and allows for patients to provide feedback about the therapy.

The PDA 64 may communicate with a secure server 68 through the Internet or any other suitable connection including wireless or wired connections 66 providing signals include frequency, intensity, therapy time, vibration time, duration of rest period between vibration, clinician calibration, and allows for patients to provide feedback about the therapy.

The secure server 68 may communicate with a work station 72 over the Internet or any other suitable connection including wireless or wired connections 70 providing signals include frequency, intensity, therapy time, vibration time, duration of rest period between vibration, and clinician calibration, and allows for patients to provide feedback about the therapy to the clinician.

The App may set the frequency of the neckband trainer 42, intensity, therapy time, vibration time, duration of rest period between vibration, and allows for patients to provide feedback about the therapy. Measurements made by the neckband trainer 42 (e.g., force measured by the exciters) may be provided to the PDA 64 via the Bluetooth® connection. Further, the system 60 may allow clinicians to monitor the patient's progress. The clinician will be able to see the device settings, frequency of the device, intensity, therapy time, vibration time, duration of rest period between vibration, number of uses, whether therapy was completed, and the patient feedback. A general state of health section for the patient may be provided to indicate how the patient is feeling before and after the therapy. The PDA 64 may be a smart phone.

While the invention herein disclosed has been described by means of specific embodiments and applications thereof, numerous modifications and variations could be made thereto by those skilled in the art without departing from the scope of the invention set forth in the claims.

What is claimed is:

1. A method of vibrationally exciting a laryngeal nerve, the method comprising:

providing a laryngeal nerve exciter system comprising:

a neckband, the neckband comprising a first free end and a second free end opposing each other to form an open front, the first free end and the second free end spaced apart by a distance, the neckband being flexible to accommodate necks of different sizes, the neckband further comprising a center portion facing the open front, a first side portion and a second side portion disposed on opposite sides of the center portion, a first exciter extending from the first free end of the neckband, the first exciter disposed between the first free end and the first side portion, the first exciter comprising a first surface coupled to the first free end of the neckband and a second surface opposing the first surface, a second exciter extending from the second free end of the neckband, the second exciter disposed between the second free end and the second side portion, the second exciter comprising a first surface coupled to the second free end of the neckband and a second surface opposing the first surface of the second exciter, and a first electrical circuit and a second electrical circuit configured to respectively control the first exciter and the second exciter, wherein each of the first side portion and the second side portion comprises a first region and a second region closer to the center portion than the first region, wherein each first region comprises a housing mounted thereon and respectively accommodating the first electrical circuit or the second electrical circuit, and wherein each first region is larger in size than each second region due to the housing, and wherein the neckband further comprises a battery compartment disposed at the center portion of the neckband and configured to accommodate a battery, and electrically coupled to each of the first electrical circuit and the second electrical circuit;

placing the neckband at least partially around a neck of a patient; and vibrationally exciting the laryngeal nerve of the patient, the vibrationally exciting including generating vibration, by the first exciter and the second exciter, and conducting, by the first exciter and the second exciter, the generated vibration to the patient's neck.

2. The method of claim 1, further comprising:

coupling a first adhesive pad and a second adhesive pad respectively to the first exciter and the second exciter, each of the first adhesive pad and the second adhesive pad comprising a first surface coupled to the second surface of the first exciter or the second exciter and a second surface opposing the first surface of each adhesive pad, the second surfaces of the first adhesive pad and the second adhesive pad being adhesive;

moving the neckband such that the first adhesive pad and the second adhesive pad are respectively positioned against a first portion and a second portion of the patient's neck different from each other and the open front of the neckband exposes the patient's throat and the respective second surfaces of the first adhesive pad and the second adhesive pad fix positions of the neckband by adhering to the patient's skin.

3. The method of claim 1, wherein the battery compartment is thicker than each of the first side portion and the second side portion of the neckband.

4. The method of claim 3, wherein the first free end and the second free end are respectively coupled to the first side portion and the second side portion in a curved manner having a first curvature when the neckband is in an original non-adjusted position.

5. The method of claim 4, wherein the first exciter and the second exciter are respectively coupled to the first free end and the second free end in a direction extending the first curvature.

6. The system of claim 4, wherein the center portion is coupled to the first side portion and the second side portion in a curved manner having a second curvature different from the first curvature when the neckband is in the original non-adjusted position.

7. The method of claim 6, wherein a radius of the first curvature is smaller than a radius of the second curvature.

8. The method of claim 1, wherein the neckband is adjustable for individual patients.

9. A laryngeal nerve exciter system for vibrationally exciting a laryngeal nerve, the system comprising:

a neckband, the neckband comprising a first free end and a second free end opposing each other to form an open front, the first free end and the second free end spaced apart by a distance, the neckband being flexible to accommodate necks of different sizes, the neckband further comprising a center portion facing the open front, a first side portion and a second side portion disposed on opposite sides of the center portion;

a first exciter extending from the first free end of the neckband, the first exciter disposed between the first free end and the first side portion;

a second exciter extending from the second free end of the neckband, the second exciter disposed between the second free end and the second side portion; and a first electrical circuit and a second electrical circuit configured to respectively control the first exciter and the second exciter, wherein each of the first side portion and the second side portion comprises a first region and a second region closer to the center portion than the first region, wherein each first region comprises a housing mounted thereon and respectively accommodating the first electrical circuit or the second electrical circuit, wherein each first region is larger in size than each second region due to the housing, and wherein the neckband further comprises a battery compartment disposed at the center portion of the neckband and configured to accommodate a battery, and electrically coupled to each of the first electrical circuit and the second electrical circuit.

10. The system of claim 9, wherein the first exciter and the second exciter are configured to vibrationally excite the laryngeal nerve of a patient, by generating vibration and conducting the generated vibration to the patient's neck.

11. The system of claim 10, wherein the first exciter comprises a first surface coupled to the first free end of the neckband and a second surface opposing the first surface, and wherein the second exciter comprises a first surface coupled to the second free end of the neckband and a second surface opposing the first surface of the second exciter, the system further comprising:

a first adhesive pad and a second adhesive pad respectively coupled to the first exciter and the second exciter, each of the first adhesive pad and the second adhesive pad comprising a first surface coupled to the second surface of the first exciter or the second exciter and a second surface opposing the first surface of the corresponding adhesive pad, the respective second surfaces of the first adhesive pad and the second adhesive pad being adhesive, wherein the first adhesive pad and the second adhesive pad are respectively configured to be positioned against a first portion and a second portion of the patient's neck different from each other, and wherein the second surfaces of the first adhesive pad and the second adhesive pad are configured to fix positions of the neckband by adhering to the patient's skin.

12. The system of claim 9, wherein the battery compartment is thicker than each of the first side portion and the second side portion of the neckband.

13. The system of claim 9, wherein the center portion is coupled to the first side portion and the second side portion in a curved manner.

14. The system of claim 9, wherein the neckband is adjustable for individual patients.

15. The system of claim 9, wherein the distance between the first free end and the second free end is less than a length of the battery compartment when the neckband is in an original non-adjusted position.

16. The system of claim 9, wherein at least one of the first free end, the second free end, or the open front faces the battery compartment.

* * * * *